No. 687,185.        W. E. ALLEN.        Patented Nov. 26, 1901.
FRUIT PICKER.
(Application filed Apr. 12, 1900.)
(No Model.)
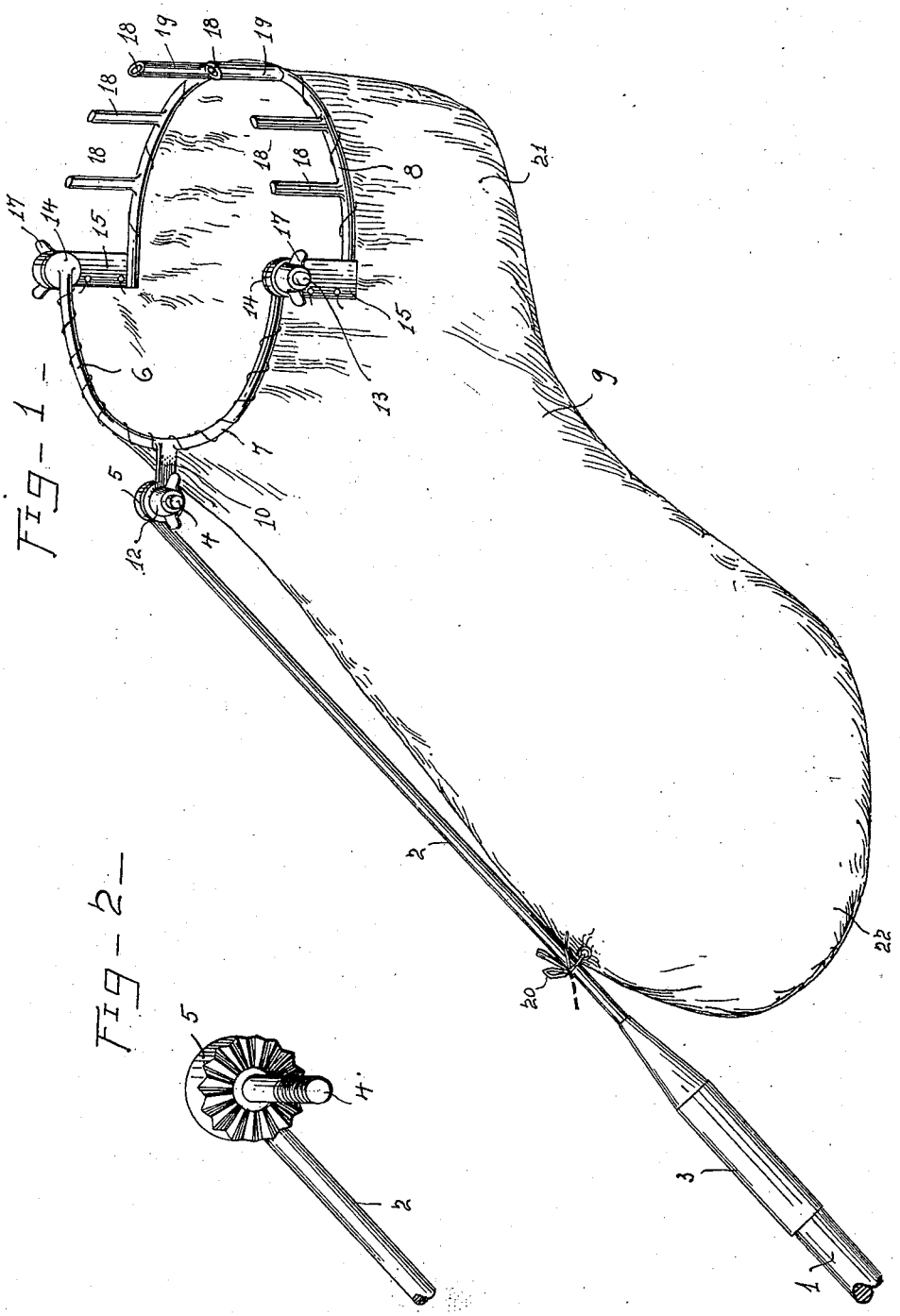

UNITED STATES PATENT OFFICE.

WILLARD E. ALLEN, OF ERIE, MICHIGAN.

FRUIT-PICKER.

SPECIFICATION forming part of Letters Patent No. 687,185, dated November 26, 1901.

Application filed April 12, 1900. Serial No. 12,501. (No model.)

*To all whom it may concern:*

Be it known that I, WILLARD E. ALLEN, a citizen of the United States, residing at Erie, in the county of Monroe and State of Michigan, have invented a new and useful Improvement in Fruit-Pickers, of which the following is a specification.

My invention relates to improvements in fruit-pickers, and has for its objects to provide an efficient, convenient, and simple implement of the kind, first, that is readily adjustable at various degrees of elevation; second, that is adapted to readily grapple the fruit without engaging the limb to which it is attached, loosen it therefrom, and receive it without injury to the fruit, and, third, that is adapted to pick a quantity of fruit before it is necessary to lower the implement to the ground. I accomplish these objects as illustrated in the drawings and hereinafter described.

In the drawings, Figure 1 is a perspective view of my invention. Fig. 2 shows the serrated face of a joint disk whereby the picker members may be locked at any desired adjustment.

In the drawings, 1 is the picker-handle, which is preferably made of wood, cane, or bamboo in jointed sections, whereby its length may be increased or diminished as the height of the fruit requires, and is provided at the upper end with a metallic shank-rod 2, having one end enlarged and provided with a socket 3 to receive the handle 1 and angled at the other end at a right angle to form a pivot 4, having its outer end threaded, to the base of which is concentrically secured a disk 5, having its outer face radially serrated.

6 is a combined picker and bag-support, comprising semi-elliptical sections 7 and 8, pivotally jointed together and forming an adjustable elliptical frame, to which is pendently secured the open end of a fruit-bag 9. Central to its curve and projecting oppositely to its ends in the plane of its curve section 7 is provided with a vertically-flattened shank 10, having an orifice adapted to receive the pivot 4 of the handle-shank 2, with one face of the shank 10 radially serrated around the orifice and adapted for engagement with the serrated face of disk-base 5 of pivot 4. When in such engagement, by running a thumb-nut 12 on the threaded portion of pivot 4 the section 7 may be locked at any desired angle to the shank 2 of the handle 1. The ends of section 7 are also oppositely angled outward in the plane of its curve at right angles to shank 10 to form pivotal supports 13 for section 8, the pivots 13 being also threaded at their outer ends and provided at their bases with concentric disks 14, the outer faces of which are also radially serrated. Section 8 is provided at each of its ends with flattened standards 15, secured thereto and projecting perpendicular to the plane of its curve, each provided with an orifice adapted to receive a pivot 13 of section 7 and having the inner faces of the standards 15, contacting with the outer faces of disks 14, radially serrated around their orifices and adapted when so pivotally connected with section 7 to be locked in any desired angle to section 7 by running thumb-nuts 17 inward on the threaded ends of pivots 13. Section 8 is also provided with a plurality of fingers 18 of equal height with standards 15 and projecting at regular intervals around its curve and vertical to its plane for grappling the fruit and disengaging it. Fingers 18 are slightly flattened on their inner faces, and are preferably provided with thimbles 19, of rubber or other suitable yielding material, whereby bruising of the fruit is avoided. Fruit-bag 9 has its top edge stepped to conform to the sections 7 and 8 when they are locked in parallel planes, and in this position the bag is secured by its upper edge by any suitable means pendently to the elliptical frame 6, with the fingers 18 projecting upward, thereby extending the mouth of the bag to conform to the opening of the frame. The bag 9 is constructed in form similar to a stocking-foot, with the leg of the stocking severed at the ankle, so that when secured, as aforesaid, with the handle 1 at an angle of forty-five degrees from the perpendicular and the elliptical frame 6 locked horizontal to the handle 1, the top portion of the fruit-bag corresponding with the instep portion of a stocking-foot will extend downward along the handle at a similar angle and the portion corresponding with the heel of a stocking will be perpendicularly beneath the opening of the bag 9. The bottom portion of bag 9 in this position is secured by lacings 20 or other suitable fastening to the handle 1, whereby the bag is partly supported by the handle when filled with fruit. Thus constructed the picker may be lifted underneath the fruit to be picked until the fruit is within the elliptical frame 6. Then by moving the picker to bring the fingers 18 in contact therewith the fruit is thereby disengaged from its stem and drops first into the heel 21 of the bag and then rolls gently down the under side to the bottom 22. In this way fruit may be picked until the bag is filled, which may then be lowered and emptied. It is apparent that thus constructed the picker-frame may be at any desired angle to the handle of the picker, as the fruit to be picked requires, and that the sections 7 and 8 may be adjusted at such angle to each other as will best adapt them to the elevation and location of the fruit, and that by the use of the fingers 18 the picker may be so adjusted as to bring the branch to which the fruit is attached between the fingers, thereby securing a better hold on the fruit and bringing farther within the mouth of the bag and so insuring its safe delivery therein.

Having thus fully described my invention, what I claim to be new, and desire to secure by Letters Patent, is—

1. In a fruit-picker, a handle provided with a shank, a frame pivotally mounted on the outer end of the shank and having its outer end stepped to a parallel plane by angled portions on opposite sides of the frame, a plurality of fingers integral with and arranged perpendicular to the outer end of the frame, with their outer ends cutting the plane of the inner end of the frame, extended; means to lock the frame at various angles to the handle; a bag secured by the hem of its mouth around the frame, pendently thereto when the frame is in a horizontal position with the fingers projecting upward, said bag having a body portion that, in such position, is extended at an angle from its mouth toward the handle and provided with means of attachment to the handle, and a ledge in the bag adapted to break the fall of the fruit.

2. A fruit-picker comprising a handle, an elliptical frame pivotally and adjustably secured to the handle, comprising semi-elliptical sections pivotally and adjustably secured together, one of said sections being provided with a shank for pivotally and adjustably securing the frame to the handle, and the other section with a plurality of vertically-projecting fingers, adapted to grapple fruit attached to a branch and disengage it therefrom, a bag secured to the frame, having its mouth extended thereby, its body portion projecting at an angle therefrom, pendently supported by the frame and the handle, said angular extension forming a ledge and an incline beneath the opening of the frame and the bag, adapted to break the fall of the fruit, substantially as shown and described.

3. In a fruit-picker, the combination with a handle of an elliptical frame comprising semi-elliptical sections pivotally and adjustably secured together, one of the sections having a shank pivotally and adjustably secured to the handle, and the other having vertically-projecting fingers at intervals around its curve, elastic thimbles for the fingers, and a bag, having one end open and secured around the frame, held open thereby, and pendently supported therefrom, and the other end closed and pendently supported by the handle, and having its body portion provided with a ledge and an incline beneath the opening of the bag, substantially as shown and described.

In witness whereof I have hereunto set my hand this 6th day of April, A. D. 1900.

WILLARD E. ALLEN.

Witnesses:
ISAAC N. FISHER,
EDITH SCHAEFER.